US009603122B2

(12) United States Patent
Farrell

(10) Patent No.: US 9,603,122 B2
(45) Date of Patent: Mar. 21, 2017

(54) COMMUNICATING NORMATIVE OUTPUT SETTINGS OF COMPUTING DEVICES OF USERS WITHIN A SOCIAL LOCALE

(71) Applicant: International Business Machines Corporation, Armonk, NY (US)

(72) Inventor: Robert G. Farrell, Cornwall, NY (US)

(73) Assignee: International Business Machines Corporation, Armonk, NY (US)

(*) Notice: Subject to any disclaimer, the term of this patent is extended or adjusted under 35 U.S.C. 154(b) by 62 days.

(21) Appl. No.: 14/668,334

(22) Filed: Mar. 25, 2015

(65) Prior Publication Data
US 2016/0286522 A1    Sep. 29, 2016

(51) Int. Cl.
*H04M 3/42* (2006.01)
*H04W 68/02* (2009.01)
*H04W 4/02* (2009.01)
*H04W 88/02* (2009.01)

(52) U.S. Cl.
CPC ............. *H04W 68/02* (2013.01); *H04W 4/02* (2013.01); *H04W 88/02* (2013.01)

(58) Field of Classification Search
CPC ........ H04W 68/02; H04W 4/02; H04W 88/02
USPC ...................... 455/414.1, 414.2, 414.3, 414.4
See application file for complete search history.

(56) References Cited

U.S. PATENT DOCUMENTS

| | | | |
|---|---|---|---|
| 6,032,051 A | 2/2000 | Hall et al. | |
| 6,396,399 B1* | 5/2002 | Dunlap | H04W 88/02 340/539.1 |
| 7,333,464 B2* | 2/2008 | Yang | H04L 67/16 370/252 |
| 7,715,835 B1* | 5/2010 | Karnik | G06Q 10/06 340/539.1 |
| 8,630,208 B1 | 1/2014 | Kjeldaas | |
| 2009/0325566 A1 | 12/2009 | Bell et al. | |
| 2013/0078976 A1* | 3/2013 | Naftolin | H04M 1/72569 455/418 |
| 2013/0078979 A1* | 3/2013 | Bell | H04W 48/04 455/418 |

(Continued)

OTHER PUBLICATIONS

IBM, "Methods to Dynamically Change States of Devices Based on Presence Information," ip.com, IPCOM000184909D, Jul. 2009, 6 pages.

*Primary Examiner* — Shahriar Behnamian
(74) *Attorney, Agent, or Firm* — Kevin Jordan; Ryan, Mason & Lewis, LLP

(57) ABSTRACT

Systems and methods are provided for user notification of normative device output settings of a plurality of mobile computing devices operating in locale. For example, a system includes a service provider, and a computing device. The computing device transmits its current locale and device output settings information to the service provider. The service provider utilizes such information to determine a normative of device output settings of registered computing devices operating in the locale, and generates a notification message that is sent to the computing device, which comprises the normative of device output settings in the locale. The computing device presents the notification message to a user of the computing device so that the user can determine whether or not a device output setting of the computing device complies with the normative of device output settings in the locale.

20 Claims, 7 Drawing Sheets

(56) References Cited

U.S. PATENT DOCUMENTS

2016/0065722 A1* 3/2016 Rose ................ H04M 1/72569
370/338

* cited by examiner

COMMUNICATING NORMATIVE OUTPUT SETTINGS OF COMPUTING DEVICES OF USERS WITHIN A SOCIAL LOCALE

TECHNICAL FIELD

This disclosure generally relates to mobile computing and, in particular, to systems and methods for enabling user control of device output settings of personal mobile computing devices.

BACKGROUND

Due to the increasing popularity of mobile computing, various types of computing devices such as mobile phones, laptop computers, electronic tablets, etc., are ubiquitously present in various environments such as business meetings, theaters, restaurants, and other social or business environments. Computing devices are capable of emitting loud sounds, such as ringing, buzzing, beeping, etc., which can be annoying and disruptive to individuals within the vicinity of a given social or business setting. While device manufacturers often include various ways for users to control or adjust output settings of their computing devices (e.g., muting, decrease volume, etc.), the users typically forget to mute or otherwise adjust the output settings of their computing devices to comply with known socially acceptable norms for the given social setting (e.g., mute the audio output of a mobile phone in a movie theater).

In other instances, a user may not readily appreciate what the socially acceptable norm is for the output settings of the user's computing device in a given environment. In such instances, a given user can become aware of the social norm for the output settings of their device by viewing the actions of others. For example, one or more users in the vicinity of a given business or social setting may be seen (by other users) adjusting their computing devices (e.g., muting or decreasing audio output), which then prompts such other users to check and/or adjust the output settings of their computing devices accordingly. However, reliance on compliance with socially acceptable norms for output settings based on viewing the actions of others is problematic for various reasons. For example, users may have already adjusted their settings prior to entering a given business or social environment. In addition, the actions of certain users in adjusting their device output settings may not be visible or apparent to other users (e.g., it may appear that a given user is muting the audio setting of the user's computing device while the given user is actually unmuting the audio setting).

SUMMARY

Embodiments of the invention include systems and methods for providing notification of normative device output settings of computing devices in a locale.

In one embodiment, a method is provided for sending notifications of device output settings to a computing device in a locale. The method includes accessing device output settings information of a plurality of computing devices operating in a locale; determining a normative of device output settings in the locale using the accessed device output settings information; generating a notification message which comprises the normative of device output settings; and sending the notification message to at least one computing device of the plurality of computing devices operating in the locale. The notification message is configured to enable a determination as to whether or not a device output setting of the at least one computing device complies with the normative of device output settings.

Another embodiment includes a method implemented by a computing device. The method includes transmitting device locale information to a server, wherein the device locale information indicates a locale in which the computing device is currently operating; transmitting device output settings information of the computing device to the server; receiving a notification message from the server, wherein the notification message comprises information with regard to a normative of device output settings of a plurality of computing devices operating in the locale, as determined by the server; and presenting the notification message to a user of the computing device. The notification message is presented in a manner that allows the user to determine whether or not a device output setting of the computing device complies with the normative of device output settings.

Another embodiment of the invention includes a system having at least one computing node of a service provider in a network communication with at least one computing device. The at least one computing node is configured to perform the steps of: receiving device output settings information and device locale information of the at least one computing device, wherein the device locale information indicates a locale in which the at least one computing device is currently operating, and wherein the device output settings information comprises output settings of the at least one computing device; determining a normative of device output settings in the locale using the device output settings information and the device locale information of the at least one computing device; generating a notification message which comprises the normative of device output settings in the locale; and sending the notification message to the at least one computing device. The notification message is configured to enable a determination as to whether or not a device output setting of the at least one computing device complies with the normative of device output settings in the locale.

These and other embodiments of the invention will be described in the following detailed description of embodiments, which is to be read in conjunction with the accompanying drawings.

DETAILED DESCRIPTION

Figure 1:
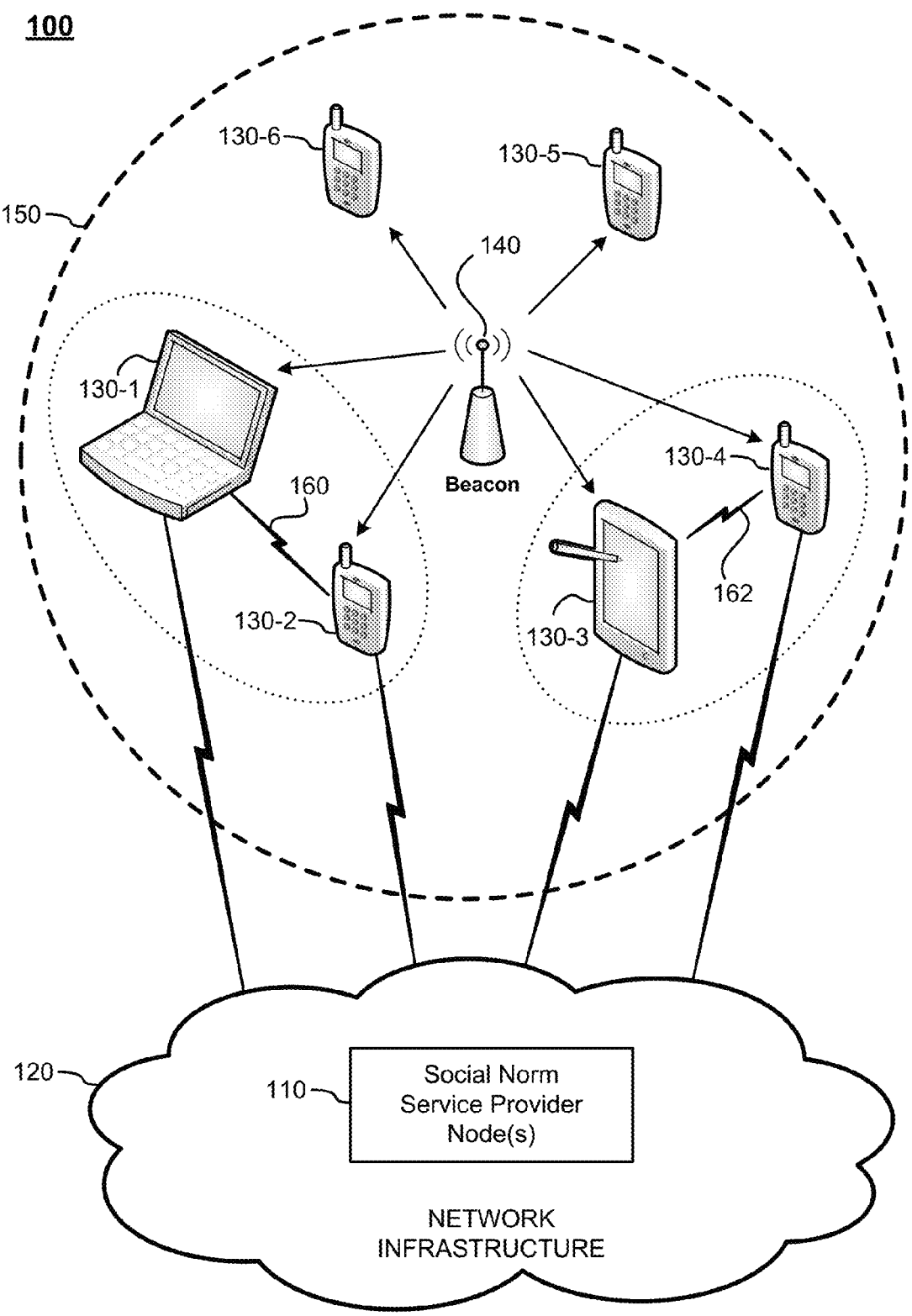
FIG. 1 illustrates a system for providing notification of normative device output settings of mobile computing devices in a social locale, according to an embodiment of the invention.
Figure 2:
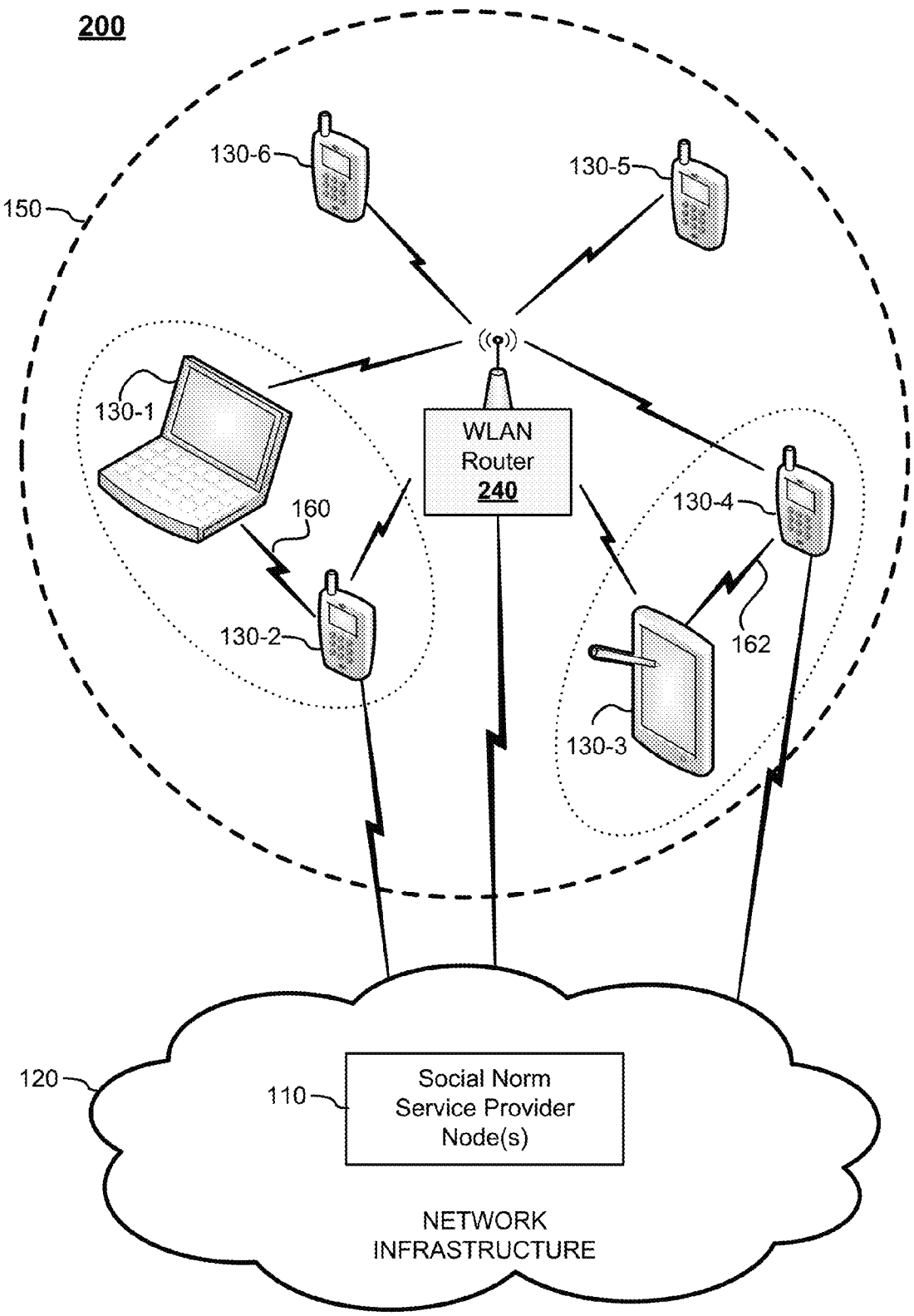
FIG. 2 illustrates a system for providing notification of normative device output settings of mobile computing devices in a social locale, according to another embodiment of the invention.
Figure 3:
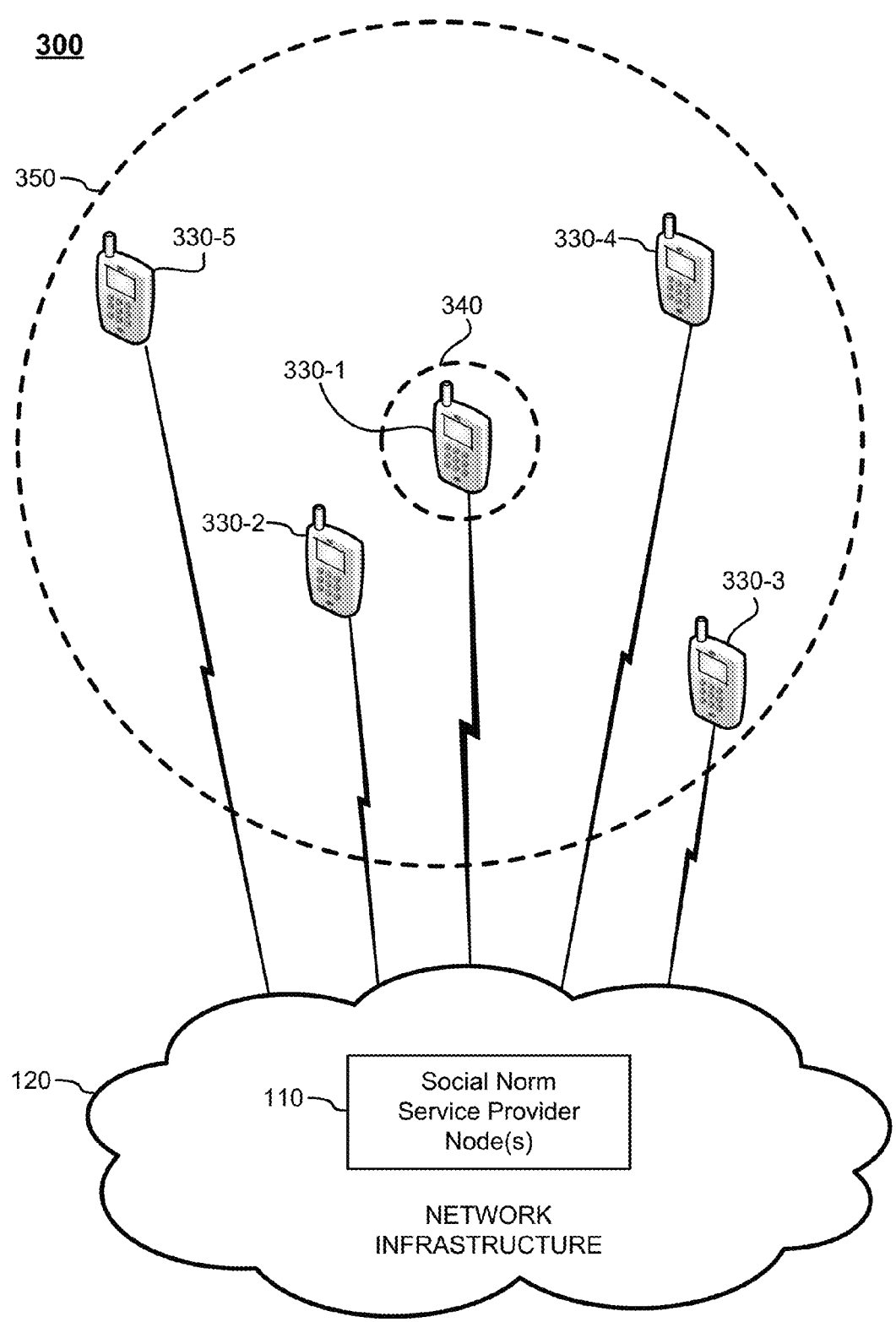
FIG. 3 illustrates a system for providing notification of normative device output settings of mobile computing devices in a social locale, according to yet another embodiment of the invention.

Embodiments of the invention will now be described in further detail with regard to systems and methods for providing notification of normative device output settings of a plurality of mobile computing devices operating in a locale. In general, FIGS. 1, 2 and 3 provide alternate embodiments of systems to provide notification of normative device output settings of computing devices within a locale. As explained in further detail below, each of the example system embodiments comprises a service provider, and a computing device in network communication with the service provider. The computing device transmits its device locale information and device output settings information to the service provider. The device locale information indicates a locale in which the computing device is operating, and the device output settings information comprises device output settings of the computing device (e.g., audio output settings, visual output settings, and/or tactile output settings, etc.).

The service provider utilizes the device locale information and device output settings information to determine a normative of device output settings of a plurality of computing devices operating in the locale, and then generates a notification message which comprises the normative of device output settings in the locale. The service provider sends the notification message to the computing device. The computing device receives the notification message and presents the notification message to a user of the computing device. The notification message is presented in a manner that allows the user to determine whether or not one or more device output settings of the computing device complies with the normative of device output settings in the locale.

More specifically, FIG. 1 illustrates a system 100 for providing notification of output settings of mobile computing devices in a social locale, according to an embodiment of the invention. The system 100 comprises a social norm service provider 110 which is implemented on one or more computing nodes (e.g., servers) within a cloud computing network 120. The system 100 further comprises a plurality of personal mobile computing devices 130-1, 130-2, 130-3, 130-4, 130-5, 130-6 (collectively referred to as computing devices 130), which are configured to communicate with the social norm service provider 110 over the network 120. By way of example, the computing devices 130 include smart phones 130-2, 130-4, 130-5, 130-6, portable laptop computers 130-1, electronic tablets 130-3, and other possible types of devices such as smart watches, PDA (portable digital assistance) devices, etc., which are configured for wireless or wired network communication.

The network 120 may comprise, for example, a global computer network such as the Internet, a wide area network (WAN), a local area network (LAN), a satellite network, a telephone or cable network, a cellular network, a wireless network such as Wi-Fi, or various portions or combinations of these and other types of networks. The term "network" as used herein is therefore intended to be broadly construed, so as to encompass a wide variety of different networks, including combinations of multiple networks of different types.

In general, the computing devices 130 are configured to transmit device locale information and current device output settings information to the social norm service provider 110. The device locale information transmitted by a given one of the computing devices 130 indicates a locale in which the given computing device is currently operating. The device output settings information that is transmitted by a given one of the computing devices 130 comprises, for example, one or more of a current audio output setting (e.g., ring muted/note muted), a current visual output setting (e.g., video output on/off), a current tactile output setting (e.g., vibration on/off), and/or other types of output settings from a given computing device of a user, which may disruptive or annoying to other individuals in proximity to the user's computing device under certain circumstances.

In one embodiment of the invention as shown in FIG. 1, a short range communication system comprising a beacon 140 is used to transmit a signal to the computing devices 130 within a locale/region 150 (e.g., meeting room) so that the computing devices can determine their presence in the given location/region. In general, the beacon 140 comprises a low power wireless transmitting device that periodically broadcasts certain beacon identifying information, such as an UUID (universally unique identifier), within a certain distance/range from the beacon 140, which can be detected and processed by the computing devices 130 to determine device locale 150 and/or context. One available technology for supporting this transmission is Bluetooth Low Energy (BLE), but other limited range transmission technologies could be used. The computing devices 130 include native operating systems or special purpose applications that are configured to discover and capture information that is broadcast by the beacon 140 and use the captured information (e.g., beacon identifier) to determine the locale 150 of the computing devices 130.

For example, in one embodiment of the invention, a given computing device can transmit the captured beacon identifying information directly to the social norm service provider 110, wherein the social norm service provider 110 determines the locale of the given computing device using the beacon identifying information based on registry information (as discussed in further detail below). In another embodiment, when a given computing device detects the beacon 140, the given computing device can communicate the beacon identifying information (and other relevant information) to a remote server associated with the beacon 140. The remote server can then push locale information to the given computing device which is then forwarded to the social norm service provider 110 by the given computing device. Alternatively, the beacon server can forward the device locale information directly to the social norm service provider 110, in which case information regarding the beacon 140 and its corresponding server are a priori known (and registered) with the social norm service provider 110.

In the embodiment of FIG. 1, the beacon 140 has a maximum transmission distance based upon its power. Computing devices can use the signal strength upon receiving transmissions from the beacon 140 to estimate distance from the beacon 140. The beacon 140 (beacon ID) may have an associated maximum distance that determines the corresponding locale 150, e.g., if the beacon 140 can transmit 10 meters maximum, then the beacon 140 may define the locale 150 as 10 meters surrounding the beacon 140, for example.

However, depending on the application, the social norm service provider 110 can define the locale 150 as being smaller than the maximum transmission distance of the beacon 140. For example, the service provider may consider a computing device to be within the locale 150 if the computing device is within 7 meters of the beacon 140, despite the beacon's maximum transmission distance of 10 meters.

While a beacon range of 10 meters may be sufficient for a locale such as a conference room of an office building, for larger areas (e.g., concert hall, theater, etc.), an appropriate beacon should be utilized which can transmit up to a range of over 10 meters. In all instances, the outer boundary of the locale/region 150 in which the computing devices 140 can detect the presence of the beacon 140 will vary depending primarily on the maximum transmission distance of the beacon 140.

The social norm service provider 110 is configured to utilize the device locale information and device output settings information which is received from the computing devices 130 to determine a normative of device output settings of the computing device 130 currently operating in the locale 150 using the accessed information, generate a notification message which comprises the determined normative of device output settings in the locale 150; and send the notification message to each of the computing devices currently operating in the locale 150. The notification message which is sent to a given computing device is configured to enable a determination as to whether or not a device output setting of the given computing device complies with the determined normative of device output settings.

The computing devices 130 are configured to receive the notification message and present the notification message to users of the computing devices 130. The notification message is presented in a manner that allows the user to determine whether or not a device output setting of the user's computing device complies with the determined normative of device output settings in the locale.

More specifically, in one embodiment of the invention, the social norm service provider 110 uses device locale information and device output settings information to determine a normative output setting for each of a plurality of different types of outputs, e.g., sound, visual, and tactile, depending on the majority consensus of the different output settings of the computing devices in the locale 150. In this regard, the computing device 130 communicate the status of each of the output setting to the social norm service provider 110. For example, a given computing device 130 can provide the output status of its sound settings (ringing, speech generation, music, etc.) by indicating if the sound is muted or not muted. A given computing device 130 can provide the output status of one or more visual settings (video display screen, LED notification alerts, etc.) by indicating if the visual settings are on or off. Moreover, a given computing device 130 can provide the output status of one or more tactile settings (e.g., vibration, shaking, mechanical, etc.) by indicating if the tactile settings are on or off.

The social norm service provider 110 will obtain information with regard to the output settings status of the computing device 130 in the locale 150 and use such information to determine the normative of device output settings for one or more different types of outputs (e.g., audio, visual, tactile, etc.). In one embodiment, the social nom service provide 110 will determine what a majority of the output settings are, and then transmit a notification to each computing device 130 along with other information that enables a user of a given computing device (or which enables the computing device itself) to determine whether or not one or more device output settings of the given computing device differs from the normative output settings (e.g., majority) of all the computing devices 130 currently operating in that locale 150 on a per output setting basis. As a result, the users of the computing devices 130 are silently alerted based on the result.

For example, in the context of FIG. 1, assume there is a group of individuals present in a meeting room, the computing devices 130 belong to individuals in the meeting and wherein the beacon 140 is located in the meeting room and configured to transmit its identification in a range that covers the locale boundary 150 of the meeting room. Assume further that the computing devices 130-1 and 130-2 belong to the same individual and are linked 160 by, e.g., a Bluetooth connection, and that the computing devices 130-3 and 130-4 belong to another individual and are linked 162 by, e.g., a Bluetooth connection. Each computing device 130 includes a social norm client application which connects to the social norm service provider 110 and provides the identification information of the beacon 140 and output settings. Using the social norm client applications, each computing device 130 determines the status of the respective output settings, and checks the privacy settings to determine if the output settings information can be provided to the social norm service provider 110. If the privacy settings allow a given computing device to communicate its output settings status to the social norm service provider 110, the computing device will transmit the identification information of the beacon 140 and the output status settings of the computing device. The social norm service provider 110 waits for output settings status from the computing device 130, computes a summary (e.g., majority setting, monitoring settings) according to a policy (e.g., do not report unless 3 or more devices), and then transmits notifications to each computing device 130 currently operating in the locale 150.

The computing devices 130 will wait to receive notifications from the social norm service provider 110 with regard to the normative of device output settings. Upon receiving notification, if there is a difference between the normative device output setting and an actual output setting of a given computing device, the given computing device 130 will report the difference to the user. The given computing device 130 can also display a control icon that the user can select to adjustably control an output setting of the given computing device, which is different from the normative device output setting.

Moreover, in another embodiment of the invention, when two computing devices of the same user are connected by a communication network (e.g., tethered using Bluetooth, connected via a local area network or a personal area network or connected by a cable, etc.), a control icon can be displayed on one computing device to control the output settings of another connected computing device of the user. For example, a use can view a flashing notification icon on his/her laptop device 130-1. The user can hover a mouse cursor over the flashing notification and a notification may display which reads your mobile phone is unmuted—Mute it now? Yes No, allowing the user to mute the mobile phone device 130-2 that is linked to the laptop device 130-1. In this regard, the social norm service provider 110 can compute a normative device output setting for each of one or more different device output settings, then each individual device can compare its settings with the normative device output setting and make the user aware of any differences. In addition, a user can change the device setting remotely in an instance when the user may only be using his/her laptop, for example, but his/her mobile phone is on but inaccessible (e.g., the mobile phone is in her/her briefcase or bag).

A normative of device output settings which is determined by the service provider may include information such a summary of the status of output settings (e.g., the majority settings) of computing devices that are currently operating in a given locale. This summary is a way of protecting the detailed information of others users of the computing devices, without sharing specific user identification information. The use of near-field communications limits the normative computation to computing devices that are within a given locale, such that the computing devices of other uses not in within a relatively small local region will not be considered when computing the normative of device output settings in a localized region.

In other embodiments of the invention, different ranges of the beacon 140 can be associated with different secondary IDs which are associated with the main ID of the beacon 140, but which are considered to be different sub-locales within the given locale 150. In this regard, a normative of device output settings can be determined for each sub-locale within a given locale 150, wherein each sub-locale is associated with a given secondary beacon ID. This allows finer grained consideration of normative device output settings in different sub-locales of a given locale which may have, for example, a "quiet" sub-local region and an acceptable "noisy" sub-locale within the given locale. For example, the sub-locales can be concentric circles around the beacon 140 with a quiet sub-locale defined by the inner concentric circle (where the beacon 140 is positioned close to the meeting area) and a less quiet sub-locale defined by the area between the inner circle (quiet area), and an outer circle surrounding the inner circle. Moreover, a given locale 150 may include two or more different beacons strategically disposed within a given locale, which also allows finer grained consideration of normative device output settings in different sub-locales of a given locale which may have, for example, different socially acceptable/reasonable norms for device output settings.

FIG. 2 illustrates a system 200 for providing notification of output settings of mobile computing devices in a social locale according to another embodiment of the invention. In general, the system 200 of FIG. 2 is similar to the system 100 of FIG. 1, expect that the system 200 comprises a wireless local area network router 240 which is used to determine the locale information of the computing devices 130 within a given locale 150. In this embodiment, the social norm service provider 100 can determine a locale of the computing devices 130 based on a network identifier (e.g., SSID) of the wireless network established around the WLAN router 240. The network identifier can be transmitted to the social norm service provider 100 by either a separate communication link or through the wireless access point provided by the WLAN router 240. In this embodiment, the SSID identifier of the Wi-Fi network would be used by the social norm service provider 110 to determine computing devices 130 that are present within the wireless network specified by the SSID information, for example.

FIG. 3 illustrates a system 300 for providing notification of output settings of mobile computing devices in a social locale according to yet another embodiment of the invention. In general, the system 300 of FIG. 3 is similar to the systems 100 and 200 discussed above, except that the system 300 of FIG. 3 utilizes a personal area network paradigm to detect presence information. In particular, as shown in FIG. 3, the system includes a plurality of mobile computing devices 330-1, 330-2, 330-3, 330-4, and 330-5 (collectively referred to as computing devices 330), which are configured to communicate with the social norm service provider 110 over the network 120. For purposes of illustration, the computing devices 330 are shown as being smart phones, but other computing devices are contemplated.

In this embodiment, the computing devices 330 that are determined to be present in a locale 350 is based on a distance from a target computing device 340. In particular, in this embodiment, location based services (e.g., Global Positioning System) can be used to determine the location of the target computing device 340, and the presence of other computing devices near the target computing device 340 can be determined from, e.g., GPS coordinates of those other computing devices. This embodiment provides a zone (e.g., local 350) in which a normative of device output settings of computing devices 330 within the zone (e.g., locale 350) surrounding a target device 340 can be determined, whereby the normative of device output settings is provided to the computing device 340. Location information is often available from a GPS chip built into the phone, or using radio-location and trilateration based on the signal-strength of the closest cell-phone towers (for phones without GPS features), and this location information can be transmitted to the social norm service provider 110.

Although the illustrative system embodiments of FIGS. 1, 2 and 3 show mobile computing devices, a given locale (which is registered with and monitored by the service provider) can have fixed (e.g., non-mobile) computing devices. For example, in a classroom locale, there can be many desktop computers having audio output capabilities. If a user of one desktop leaves the audio setting on when viewing a video, and a teacher begins lecturing, such audio can be disruptive to the lecture. In this regard, if a majority of the desktops have the audio turned off or set to low levels, the user of the desktop with the audio set to "on" can be provided a notification (e.g., displayed on the associated monitor) that the audio setting of that user's desktop is not in compliance with the normative of audio settings of computing devices in the classroom locale.

Figure 4:
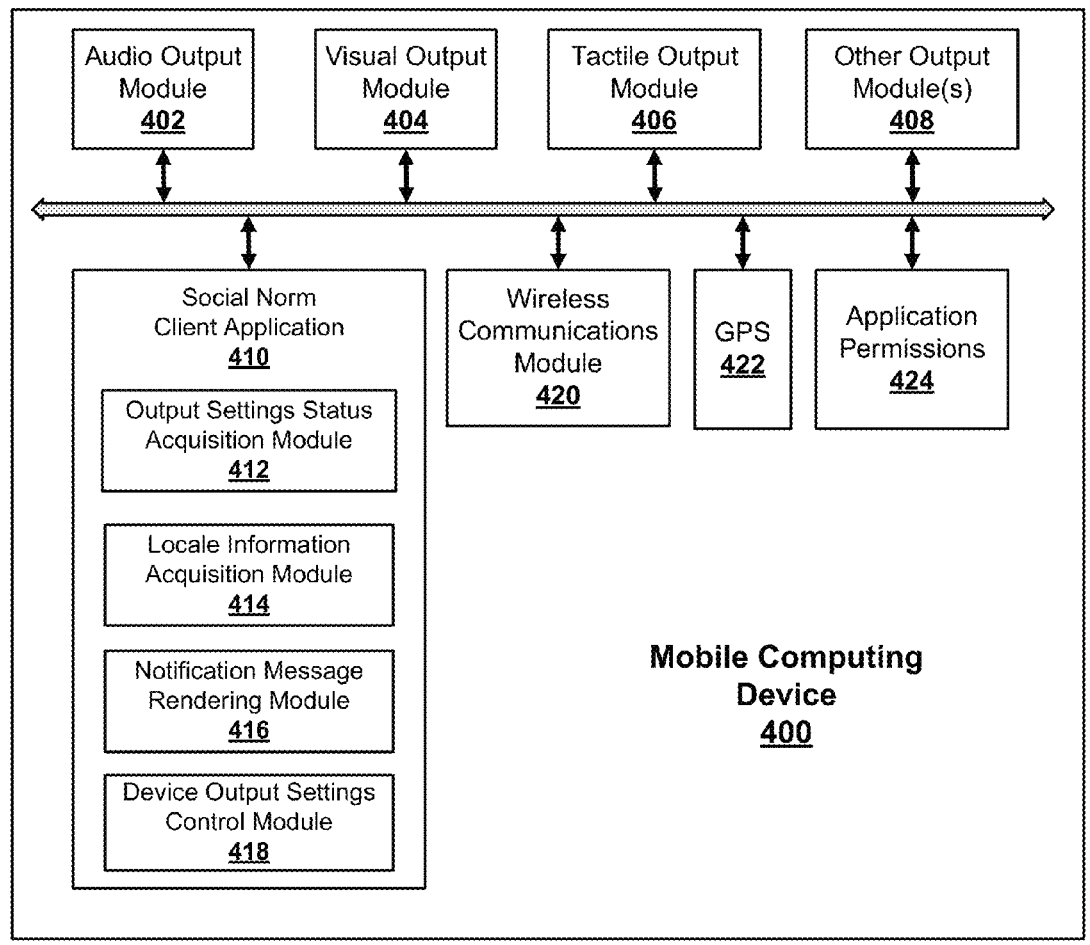
FIG. 4 schematically illustrates a computing device comprising various modules that are used to support notification of normative device output settings of mobile computing devices in a social locale, according to an embodiment of the invention.

FIG. 4 schematically illustrates a computing device comprising various modules that are utilized to support notification of output settings of mobile computing devices in a social locale, according to an embodiment of the invention. In general, a mobile computing device 400 as shown in FIG. 4 comprises an audio output module 402, a visual output module 404, a tactile output module 406, and modules for other device outputs 408. The computing device 400 further comprises a social norm client application 410 which comprises an output settings status acquisition module 412, a locale information acquisition module 414, a notification rendering module 416, and an output settings control module 418. The computing device 400 further comprises a wireless communications module 420, a GPS (global positioning system) module 422, and an application permissions module 424.

The audio output module 402 collectively comprises the software, hardware, firmware, etc., which is configured to control the audio output settings of the mobile computing device 400 (e.g., types of ringtones or audio notifications, volume control, muting, etc.). The visual output module 404 collectively comprises the software, hardware, firmware, etc., which is configured to control the visual output settings of the mobile computing device 400 (e.g., control display notifications, control activation/deactivation of LCD display, control LED (light-emitting-diode) notifications, etc.). The tactile output module 406 collectively comprises the software, hardware, firmware, etc., which is configured to control tactile output settings of the mobile computing device 400 (e.g., control intensity and/or pattern of vibrational output notifications, etc.). The other outputs module 408 collectively comprises the software, hardware, firmware, etc., which is configured to control other types of output settings that may be implemented by the mobile computing device 400 for providing notifications.

The social norm client application 410 comprises a client application that works in conjunction with a cloud based service provider (e.g., social norm service provider 110 of FIG. 5) to provide notifications to the user of the mobile computing device 400 with regard to the social normative of device output settings in a given locale in which the user is using his/her computing device 400. In one embodiment, the social norm client application 410 may be an embedded application that is included as part of the computing device 400 as originally manufactured, wherein the user has to option to activate the social norm client application 410 and register with a cloud based service provider (e.g., the social norm service provider 110 of FIG. 5). In another embodiment, the social norm client application 410 can be a third-party application that a user downloads to, or otherwise has installed on, the mobile computing device 400 at the option of the user.

The wireless communications module 420 collectively comprises the software, hardware, firmware, etc., which is configured to establish and support wireless communications using, e.g., Bluetooth, or Wifi, or other near field communications (NFC) protocols. The wireless communications module 420 is configured to wirelessly communicate with, e.g., a beacon (such as in the system embodiment of FIG. 1), or to wireless communicate with a wireless access point such as a WLAN router (such as in the system embodiment of FIG. 2), etc. The GPS module 422 collectively comprises the software, hardware, firmware, etc., which is configured to establish and support GPS positioning or other types of location based services, which can be used to support the system embodiment as discussed above with reference to FIG. 3.

The application permissions module 424 is component of a native operating system of the mobile computing device 400, which a user can utilize to change settings that control what information and functions an application can access on the mobile computing device 400, such as email messages, contacts, pictures, or GPS, for example. In addition, the application permissions module 424 allows a user to control whether information can be transferred from the mobile computing device 400 a remote device or server, for example, such as over an Internet or Bluetooth connection. In the context of the embodiments discussed herein, the application permissions module 424 can be utilized to adjust settings for controlling operation of the social norm client application 410, as will be discussed in further detail hereafter.

The output settings status acquisition module 412 of the social norm client application 410 is configured to acquire and send information regarding the current device output settings of the mobile computing device 400 to the service provider (e.g., the social norm service provider 110 of FIG. 5) upon the occurrence of one or more predefined events. Moreover, the locale information acquisition module 414 is configured to acquire and send information with regard to the current location of the mobile computing device 400 upon the occurrence of one or more predefined events. In one embodiment of the invention, the output settings status acquisition module 412 and the locale information acquisition module 414 provide such information using push messages that are automatically generated and sent to the service provider (e.g., social norm service provider 110, FIG. 5) upon the occurrence of certain predefined events.

For example, in one embodiment of the invention, a predefined event includes the mobile computing device 400 discovering a beacon (e.g., beacon 140 in FIG. 1) or connecting to a LAN or other network (e.g., WLAN 240, FIG. 2), for example, within a given locale. In this circumstance, when the mobile computing device 400 enters a given locale (e.g., within broadcasting range of beacon or a wireless access point of LAN), or when the mobile computing device 400 is powered-up (e.g., turned on) while in a given locale, the locale information acquisition module 414 will acquire the locale identifying information (e.g., beacon ID or SSID of LAN, etc.) of the given locale. Moreover, the output settings status acquisition module 412 will obtain or otherwise determine the current audio, visual and/or tactile output settings of the mobile computing device 400. The social norm client application 410 will then generate one or more push messages to send the information regarding the current locale and output settings of the mobile computing device 400 to the service provider 110.

Furthermore, in other embodiments of the invention, the predefined events include a detected change in the status of one or more output settings of the mobile computing device 400 or a power-down event (e.g., turning off) of the mobile computing device 400. For example, when the mobile computing device 400 is within a given locale, a user may change one or more of the output settings of the mobile computing device 400, or otherwise shut off the mobile computing device 400. In such circumstances, the change in status (e.g., change in an output setting or device being turned off) is pushed to the service provider 110 so that the service provider 110 can update the status information of the given mobile computing device 400 and use such updated status information to determine or otherwise compute an updated social normative of device output settings in the given locale.

In another embodiment of the invention, for a personal area network paradigm as discussed above with reference to FIG. 3, a predefined event for sending a push message with device output settings and locale information may be the expiration of a given time period, wherein the current status of device output settings and/or locale information may be automatically sent to the service provider 110 on a periodic basis. In another embodiment, the sending of a push message with device output settings and/or locale information may be a user-initiated event, wherein the user initiates sending of status information by interacting with the social norm client application 410.

By way of example, when a user enters a given locale and would like to have information regarding the normative device output settings within the given locale, the user can utilize the mobile computing device 400 to send the current GPS coordinates of the mobile computing device 400 to the service provider 110. The service provider 100 can then determine a social normative of device output settings for personal computing devices within a localized region around the user's current GPS location.

In another embodiment of the invention, when a computing device, such as a mobile phone, is configured to provide location information (e.g., system embodiment of FIG. 3), the social norm client application 410 running on the mobile phone can register with the native operating system of the mobile phone (iOS or Android or other) to receive location notification messages from OS. When the location of the mobile phone changes, the social norm client application 410 is notified of such change and the notification message can include the current location, e.g., GPS location. The social normal client application 410 then sends this information the social norm service provider.

The notification message rendering module 416 is configured to process and render notification messages received from the service provider 110, which provide notifications of current social normative of device output settings of all registered (and monitored) personal computing devices in the given locale. For example, in one embodiment of the invention, the notification message rendering module 416 renders and displays a notification message on the mobile computing device 400, which specifies the current social normative of device output settings as determined by the service provider 110 at a given time and/or the status of the current output settings of the user's computing device 400 as compared to the current social normative of device output settings at the given time.

The device output settings control module 418 is configured to allow the user to control or otherwise adjust one or more device output settings of the mobile computing device 400 and/or another personal computing device of the user which is connected to the mobile computing device 400 via a local connection, e.g., Bluetooth coupled devices. By way of example, the notification message rendering module 416 may render and display a notification message which indicates that a majority of the computing devices in the given locale have audio/ringtone settings set to "muted", but that the user's audio/ringtone settings are set to "not muted". In this circumstance, a control message can be displayed on the user's mobile computing device 400 which states "Do you want to mute audio settings?" along with "Yes" and "No" control icons that can be selected by the user to change or maintain current output settings of the mobile computing device 400 via the device output settings control module 418 of the client application 410.

Figure 5:
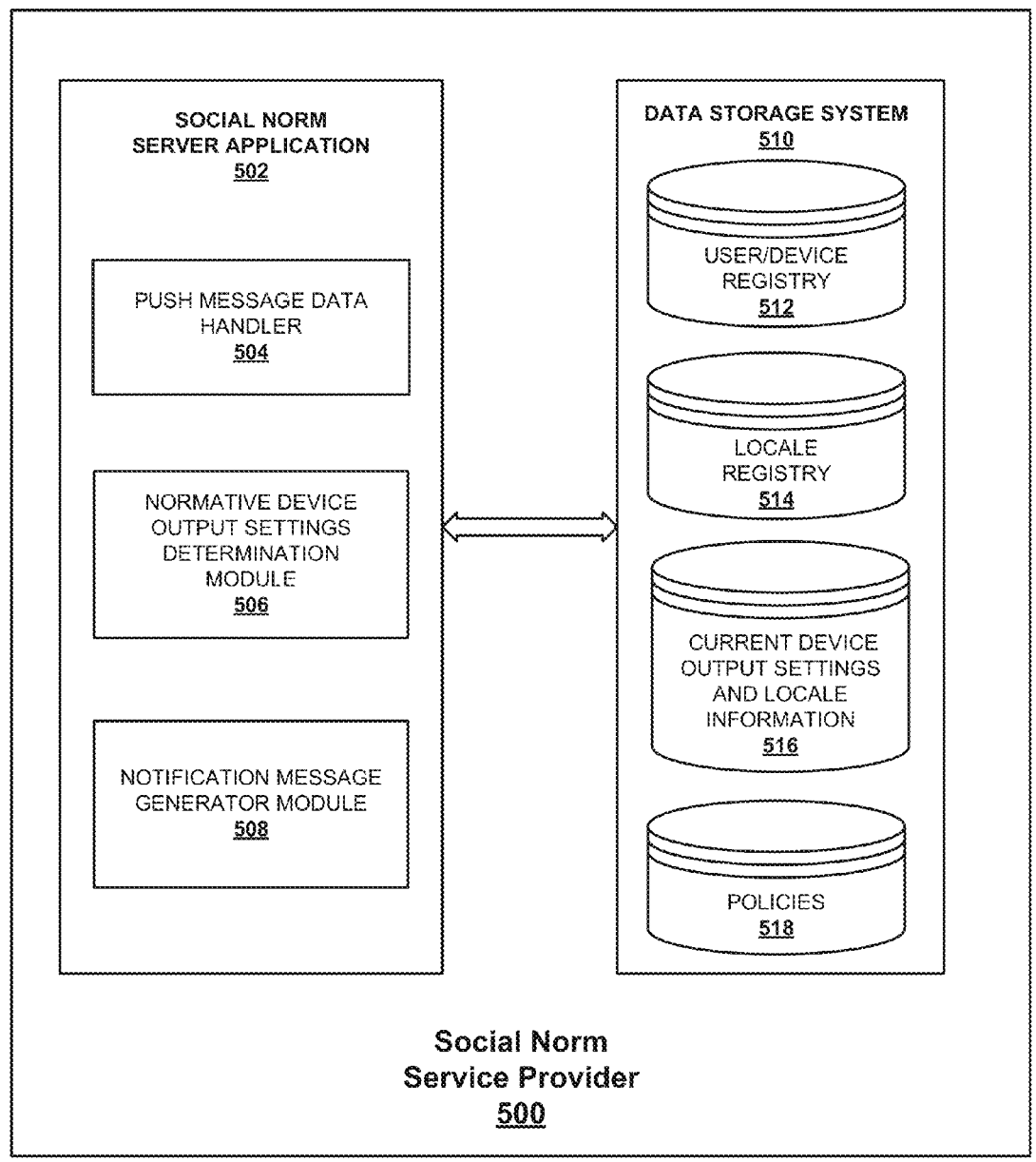
FIG. 5 schematically illustrates a computing system of a service provider that is configured to provide notification of normative device output settings of mobile computing devices in a social locale, according to an embodiment of the invention.

FIG. 5 schematically illustrates a computing system of a service provider that is configured to provide notification of normative device output settings of mobile computing devices in a social locale, according to an embodiment of the invention. In one embodiment of the invention, FIG. 5 illustrates an embodiment of a computing system 500 to implement the social nom service provider 110 as depicted in FIGS. 1, 2 and 3, for example. As shown in FIG. 5, the computing system 500 includes a social norm server application 502 which comprises a push message handler 504, a normative device output settings determination module 506, and a notification message generator module 508. The computing system 500 further comprises a data storage system 510 which is utilized by the social norm server application 502 to persistently store and maintain various types of system data include a user/device registry 512, a locale registry 514, a database of current device output settings and locale information 516, and a database of policies 518. The various components of the computing system 500 may be implemented on one computing node of a network, or distributed among multiple computing nodes of a network.

The push message handler 504 is configured to process push messages received from registered computing devices, and to push notification messages to registered computing devices, which are generated by the notification message generator module 508. The normative device output settings determination module 506 is configured to determine normative device output settings of registered computing devices that are currently operating in a given locale. In one embodiment of the invention, the normative device output settings may comprise a computed parameter, e.g., a percentage of devices having a given output setting set to a given parameter, etc. In another embodiment, the normative of device output settings may comprise a summary compilation of the current device output settings of registered computing devices that are currently operating in a given locale.

The notification message generator module 508 is configured to generate notification messages that are to be sent (e.g., pushed) to registered computing devices via the push message handler 504. In one embodiment of the invention, a notification message which is sent to a given mobile computing device includes information regarding the normative of device output settings information (which is generated by module 506) in a locale in which the given mobile computing device is currently operating. In another embodiment of the invention, the notification message further includes the current device output settings of the given mobile computing device. In other embodiments of the invention, other types of information as described herein can be included in notification messages that are sent from the social normal server application 502 to a mobile computing device.

The user/device registry 512 stores and maintains registration information regarding registered users and their devices. In one embodiment of the invention, the user/device registry 512 stores various types of user and device registration information in tabular data structures such as shown in the following TABLE 1:

TABLE 1

| USER ID | DEVICE ID | DEVICE ADDRESS | NOTIFICATION METHOD | NOTIFICATION ADDRESS |
|---------|-----------|----------------|---------------------|----------------------|
| U1 | D1 | IP_address_1 | e-mail | e-mail_address |
| U1 | D2 | IP_address_2 | Laptop | Laptop_address |
| U2 | D3 | IP_address_3 | Device_D3 | IP_address_3 |
| U2 | D4 | IP_address_4 | Device_D4 | IP_address_4 |
| ... | ... | ... | ... | ... |
| Un | Dm | ... | ... | ... |

In the above TABLE 1, the USER ID provides a unique user identifier for each user (e.g., n users) that is registered with the service provider computing system 500. The DEVICE ID provides a unique device identifier for each computing device (e.g., m devices) that is registered with the service provider computing system 500. A given user (e.g., user U1) can have multiple devices (e.g., devices D1 and D2) registered with the computing system 500, wherein the DEVICE ID of the computing devices are associated with the given user. In one embodiment of the invention, the DEVICE ADDRESS specifies a current network address (e.g., IP address) of each registered computing device.

Furthermore, the NOTIFICATION METHOD species the manner in which the user wants to receive notification messages (e.g., normative output settings information) with regard to a given registered computer device of the user. The NOTIFICATION ADDRESS specifies an address (e.g., e-mail address, network address, etc.) to which notifications are to be sent in connection with the associated NOTIFICATION METHOD.

By way of example, as shown in TABLE 1, the user U1 receives e-mail notifications with regard to computing device D1 to a specified e-mail_address. In addition, the user U1 receives notifications with regard to computing device D2 to the user's laptop device with the specified network address Laptop_address, which is different from the computing device D2. As further shown in the example TABLE 1, the user U2 receives notifications with regard to computing device D3 directly to the user's computing device D3.

The locale registry 514 stores and maintains information regarding various locales that are registered with the service provider computing system 500. In one embodiment of the invention, the locale registry 514 stores various types of locale information in Tables such as shown in the following TABLE 2:

TABLE 2

| LOCALE ID | BEACON ID | LOCALE TYPE |
|---|---|---|
| L1 | B1 | Library |
| L2 | B2 | Movie Theater |
| L3 | B3 | Conference Room |
| ... | ... | ... |
| Li | Bi | ... |

In the above TABLE 2, the LOCALE ID provides a unique locale identifier for each locale (e.g., i locales) that is registered with the service provider computing system 500. The BEACON ID provides a unique device identifier for a given beacon (e.g., system of FIG. 1) that is associated with the given locale. The LOCALE TYPE provides a parameter that identifies the type of locale associated with the LOCALE ID. As explained below, in one embodiment of the invention, the LOCALE TYPE information can be used or otherwise considered (e.g., in conjunction with a specified policy) when the service provider 500 determines normative device output settings and generates notification messages to registered computing devices. Although the exemplary TABLE 2 above shows Beacon IDs, the table can include other types of locale information, such as SSIDs for the system embodiment of FIG. 2, and/or GPS location information for the system embodiment of FIG. 3, for example. In another embodiment as noted above, a given locale can have two or more BEACON IDs associated with the given local, for example.

The database of current device output settings and locale information 516 comprises data structures to store and maintain information regarding the current device output settings of multiple registered computing devices currently operating in a given locale. For instance, in one embodiment of the invention, for each registered locale, the database of current device output settings and locale information 516 comprises a list of all registered computing devices (e.g., list of all DEVICE IDs) currently operating in the registered locale. Moreover, for each registered computing device, the database of current device output settings and locale information 516 comprises data structures to store status information regarding the current device output settings of the computing device. For example, in one embodiment of the invention, status information for output settings of a given computing device is maintained in tabular form as follows:

TABLE 3

| DEVICE OUTPUT SETTINGS OUTPUT PARAMETER | DEVICE ID = D1 OUTPUT PARAMETER VALUE |
|---|---|
| ALL OUTPUT SETTINGS | All_OFF/All_Not_OFF |
| (i) ALL AUDIO OUTPUTS | All_Muted/All_Not_Muted/All_Low |
| Call Ringtone | Muted/Not_Muted/Low |
| E-Mail Notification | Muted/Not_Muted/Low |
| ... | ... |
| (ii) ALL VISUAL OUTPUTS | All_OFF/All_Not_Off |

TABLE 3-continued

| DEVICE OUTPUT SETTINGS OUTPUT PARAMETER | DEVICE ID = D1 OUTPUT PARAMETER VALUE |
|---|---|
| LED Notification | OFF/ON |
| Video Notification | OFF/ON |
| ... | ... |
| (iii) ALL TACTILE OUTPUTS | All_OFF/All_Not_Off |
| Vibrational Notification | OFF/ON/Low |
| ... | ... |

The above TABLE 3 illustrates a level of granularity with which status information can be maintained and tracked for device output settings of a registered computing device (e.g., a device with identifier DEVICE ID=D1), according to an embodiment of the invention. The same or similar information can be maintained and tracked for each registered computing device, depending on the device output capabilities and user-adjustable settings of the computing device. In the above example of TABLE 3, a high-level status information can be tracked and maintained for an output parameter ALL OUTPUT SETTINGS, which is a global parameter that pertains to all output capabilities of the given computing device. The parameter ALL OUTPUT SETTINGS can be set to All_OFF if all of the output settings (audio, visual, tactile, etc.) of the given computing device are turned off or muted—otherwise such parameter can be set to All_Not_OFF, if one or more of the output settings are not turned off or muted.

Furthermore, in the above example of TABLE 3, global status information can be tracked and maintained for each specific type of output setting, e.g., audio, visual, tactile, etc. In particular, as shown in TABLE 3, status information can be tracked and maintained for an output parameter ALL AUDIO OUTPUTS, which is a global parameter that pertains to all audio output capabilities of the given computing device (e.g., call ringtones, e-mail audio notifications, messaging audio notifications, etc.). The parameter ALL AUDIO OUTPUT can be set to All_Muted if all of the audio output settings of the given computing device are muted—otherwise such parameter can be set to All_Not_Muted, if one or more of the audio output settings are not muted.

Furthermore, in the above example of TABLE 3, status information can be tracked and maintained for each specific type of audio output setting e.g., call ringtones, e-mail audio notifications, messaging audio notifications, etc. In particular, as shown in TABLE 3, status information can be tracked and maintained for the output parameter CALL RINGTONE and E-MAIL NOTIFICATION, etc. These parameters can be set to values such as Muted if the corresponding audio output setting is muted, Not_Muted if the corresponding audio output setting is not muted, or set to Low if the corresponding audio output setting is not muted, but set on a "Low" setting.

Similarly, as shown in TABLE 3, global status information can be tracked and maintained for specific types of output setting parameters such as ALL VISUAL OUTPUTS and ALL TACTILE OUTPUTS, and well as for each specific type of visual and tactile output, examples of which are shown in TABLE 3. The different output parameter values shown in TABLE 3 for such output parameters is the same or similar to the output parameters for the global and specific audio output settings as discussed above.

The policies 518 include various conditions and rules that may be used by the modules 506 and 508 when determining normative device output settings for a given locale, and generating notification messages with status information to send to computing devices. For example, in one embodiment of the invention, a given policy may specify that a normative of device output settings for a given locale will be determined/updated only when a pre-specified number of registered computing devices (e.g., three or more) are currently operating in the given locale, and/or that notifications are generated and sent to computing devices in a given locale only when the pre-specified number of registered computing devices are currently operating in the given locale.

In another embodiment, a policy may specify that for a given type of locale, irrespective of, or in addition to, the current normative of device output settings in a locale of the given type, a notification message may include a suggestion for the user to mute or otherwise turn off one or more different types of output settings that may be disruptive for the given locale. For example, in a quiet locale such as a library, it may be assumed that it is socially proper to have all audio settings muted for a computing device within the library locale. Moreover, for a locale such as a theater, it may be assumed that it is socially proper to have all audio and visual output setting muted or turned off, as such device outputs can be disruptive to other individuals in a theater locale. In this regard, the LOCALE TYPE of a given registered locale (e.g., TABLE 2) can be considered when sending notification messages to computing devices in certain types of locales in which there are, e.g., socially expected norms for device output settings.

In other embodiments of the invention, other types of policies may be specified, or historical information considered, to provide rules, conditions, or contextual information which enables the determination of normative device output settings in a given locale and/or provides certain status information and suggestions in notification messages that are generated and sent to the registered computing devices. For example, a normative of device output settings for a given locale can be determined based on the device output settings of computing devices previously operating in the given locale in addition to, or in lieu of, the device output settings of computing devices currently operating in the given locale. For example, when a user enters a registered locale associated with a beacon—a meeting room, for example—that locale may have an associated normative of device output settings previously computed from a last time there was a group meeting in that locale. In this circumstance, even if there is no one else in the meeting room at that time, the user can receive a notification suggesting to mute his/her phone, for example, assuming the previously determined normative for that locale indicated that most people muted their phone when previously in that locale.

Figure 6:
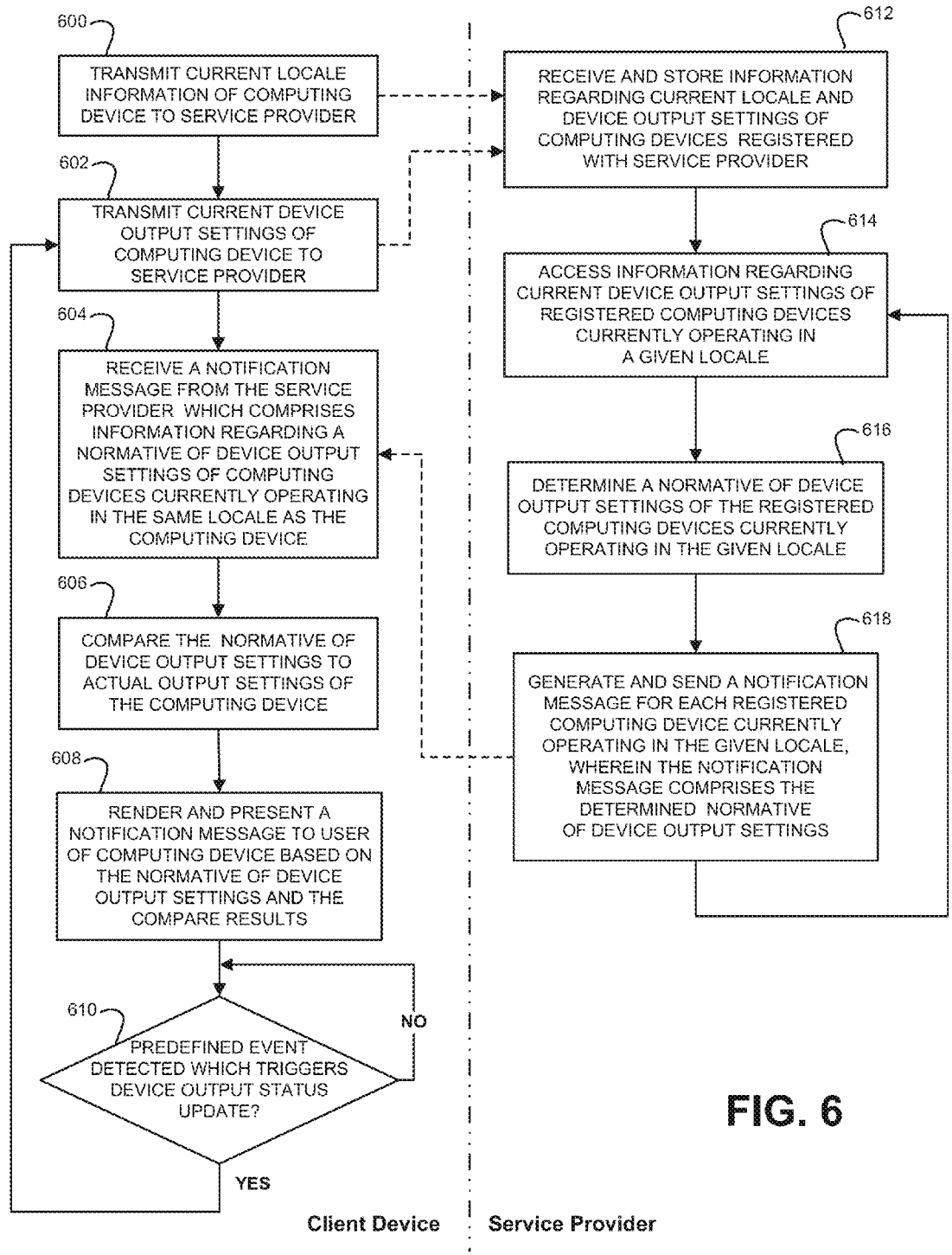
FIG. 6 is a flow diagram that illustrates a method to provide notification of normative device output settings of mobile computing devices in a social locale, according to an embodiment of the invention.
Figure 7:
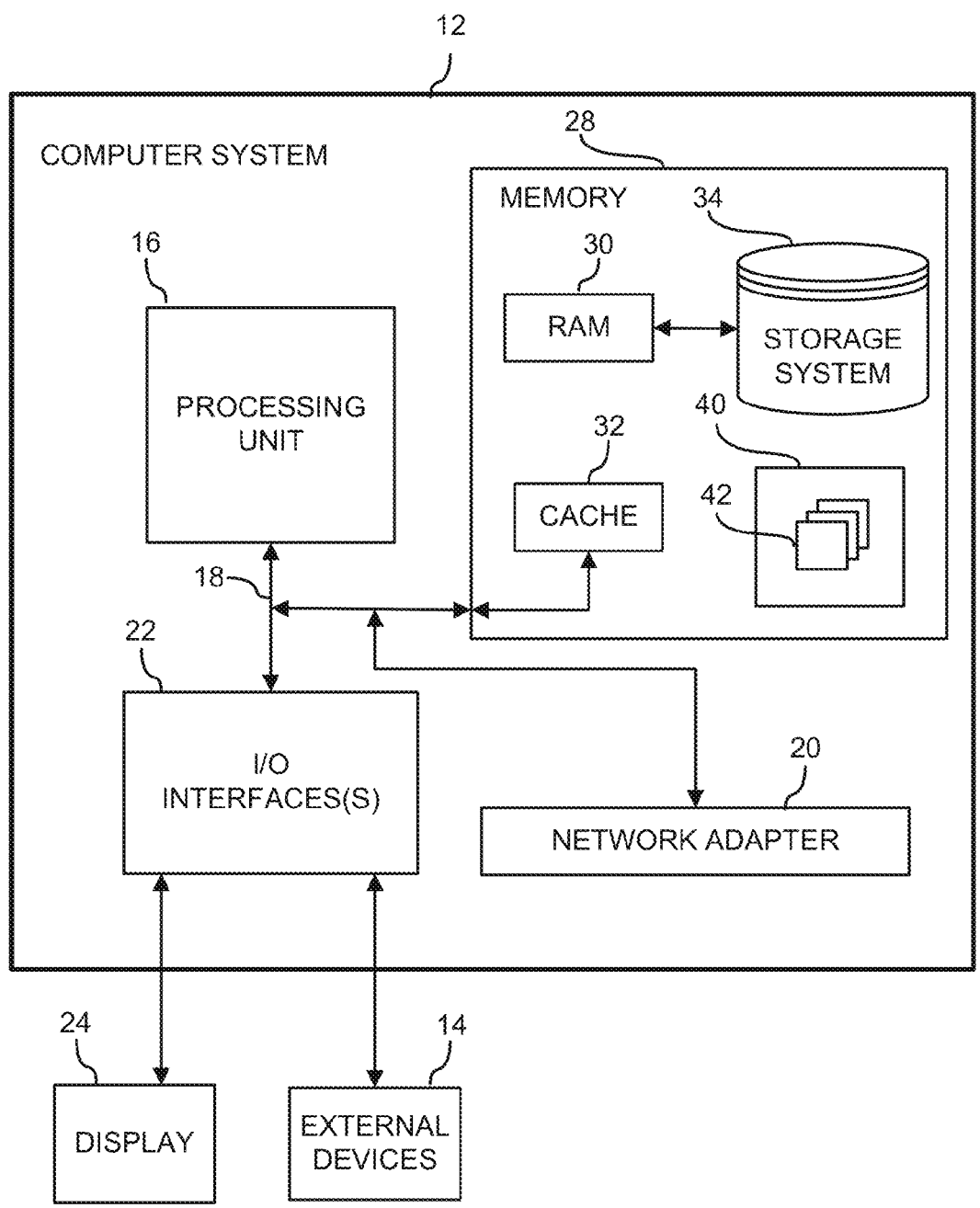
FIG. 7 illustrates a computer system that may be used to implement one or more components/steps of the techniques of the invention, according to an embodiment of the invention.

FIG. 6 is a flow diagram that illustrates a method to provide notification of normative device output settings of mobile computing devices in a social locale, according to an embodiment of the invention. In one embodiment of the invention, FIG. 6 illustrates a mode of operation of the social norm client application 410 of FIG. 4, and a mode of operation of the social norm server application 502 of FIG. 5, according to an embodiment of the invention. For purposes of illustration, the process steps of FIG. 6 will be discussed with reference to components of a mobile computing device 400 as shown in FIG. 5, and components of the service provider computing system of FIG. 5. For example, in one embodiment of the invention, the process steps 600-610 in FIG. 6 comprise functions that are implemented by a client device (e.g., mobile computing device 400 of FIG. 4), while the process steps 612-618 in FIG. 6 comprise functions that are implemented by a service provider (e.g., service provider computing system 500 of FIG. 5).

Referring to FIG. 6, an initial step includes transmitting current locale information of a given computing device to the service provider 500 (block 600). For example, in one embodiment of the invention, the process of block 600 may be performed by the locale information acquisition module 414 (FIG. 4), wherein the wireless communication module 420 (FIG. 4) is utilized to communicate with a beacon (beacon 140, FIG. 1) or a router (WLAN router 240, FIG. 2) to obtain a beacon ID or an SSID, or other type of network identifier associated with a registered LOCALE ID, for example. In another embodiment, the process of block 600 includes the locale information acquisition module 414 interacting with the GPS module 422 to obtain a current GPS coordinate of the given computing device. As noted above, in one embodiment of the invention, transmission of the current locale information can be automatically triggered upon the computing device discovering a beacon or initially connecting to a local area network, for example.

In addition, the computing device will transmit its current device output settings to the service provider (block 602). For example, in one embodiment of the invention, the process of block 602 may be performed by the output settings status acquisition module 412 (FIG. 4) directly communicating with the various output modules 402, 404, 406, and/or 408 (FIG. 4) or by obtaining device output status information maintained by a "notifications center" of the computing device. As noted above, in one embodiment of the invention, transmission of the current device output settings information can be automatically triggered upon the computing device discovering a beacon or initially connecting to a local area network, for example. The current device output settings can be transmitted after or concurrently with the locale information.

Furthermore, in one embodiment of the invention, the process of blocks 600 and 602 can be controlled by the applications permission module 424, wherein a user can adjust control settings associated with the social norm client application 410 to "allow" or "not allow" the locale and device output settings information to be automatically transmitted to the computing system 500 of the service provider.

The service provider will receive and store the current locale and device output settings information received from the given computing device, as well as current locale and device output settings information received from other computing devices that are registered with the service provider (block 612). In one embodiment of the invention, the current locale and device output settings information of registered computing devices is stored in the database of current device output settings and locale information 516 (FIG. 5). For example, in one embodiment of the invention as discussed above, the current device output settings information of each registered computing device is stored in a corresponding table data structure (e.g., TABLE 3). In addition, the service provider will maintain updated lists of all registered computing devices that are currently operating in each registered locale, which lists are also stored in the database of current device output settings and locale information.

When an initial or updated normative of device output settings is to be determined for a given locale, the service provider will access the information regarding the current device output settings of the registered computing devices currently operating in the given local (block 614), and then proceed to utilize the accessed information to determine the normative of device output settings for the given locale (block 616). For example, in one embodiment of the invention, the normative device output settings determination module 506 (FIG. 5) will access the database of current device output settings and locale information 516 to obtain information regarding the current device output settings of the registered computing devices currently operating in the given locale, and then use such accessed information to determine a normative of device output settings for the given locale.

In one embodiment of the invention, the normative of device output settings may comprise a summary status of the output settings of devices in the given locale, wherein the summary status can vary depending on the level of granularity with which status information is maintained for the device output settings of a registered computing devices. For example, with illustrative reference to the information shown in TABLE 3 above, for summaries of global status, the normative of device output settings can be summary of how many computing devices within the given locale have an output parameter ALL OUTPUT SETTINGS set to All_OFF and how many have such output parameter set to All_Not_OFF. In this regard, the normative of device output settings can be a summary report which indicates that, e.g., 75% of the computing devices in the given locale have all device output settings turned off.

Similarly, in another embodiment of the invention, the type of summary data of normative device output settings can be determined for one or more of the global output parameters ALL AUDIO OUTPUTS, ALL VISUAL OUTPUTS, ALL TACTILE OUTPUTS, etc., as shown in TABLE 3, for example. By way of example, the normative of device output settings can be summary of how many computing devices within the given locale have an output parameter ALL AUDIO OUTPUTS set to All_Muted, or All_Not_Muted or All_Low. In this regard, the normative of device output settings can be a summary report which indicates that, e.g., 75% of the computing devices in the given locale have all of the audio output settings muted, 20% of the computing devices do not have all the audio output settings muted, and 5% of the computing devices have all the audio output settings set to a low level. Similar summary data can be generated for normative device output settings with regard to the other global output parameters ALL VISUAL OUTPUTS, ALL TACTILE OUTPUTS, etc.

Furthermore, in another embodiment of the invention, the type of summary data of normative device output settings can be determined for one or more of the specific types of output parameters for one or more of the given output types. For example, the normative of device output settings can be summary of how many computing devices within the given locale have an output parameter CALL RINGTONE set to Muted, or Not_Muted or Low.

In another embodiment of the invention, the summary data that is determined for a given locale may depend on the type of locale. In this embodiment, the normative device output settings determination module 506 may access information contained in the locale registry 514 to determine the LOCALE TYPE of the given locale, and then determine what output device settings information to utilize when computing the normative of device output settings. By way of example, if the given locale is a library, then the only output parameters that may be considered when computing the normative of device output settings are audio and vibrational output settings, as these types of outputs can be disruptive in a library locale, whereas video device outputs are not disruptive in a library locale. In a movie theater locale, for example, all types of device output settings (e.g., audio, vibrational, visual) can be disruptive to other individuals.

The determination of normative device output settings can be performed in accordance with one or more policies specified in the database of policies 518. For example, as noted above, a given policy may specify that the computation of normative device output settings in a given locale is performed only when a certain number of registered computing devices are currently operating in the given locale. In another embodiment, one or more policies may specify the types of output settings that should be considered when computing a normative of device output settings for a given type of locale.

Referring again to FIG. 6, once the normative of device output settings is determined for a given locale, the service provider will generate and send a notification message for each registered computing device currently operating in the given locale (block 618). In one embodiment of the invention, the notification message comprises the determined normative of device output settings for the given locale, e.g., a summary of the status one or more of the global and/or specific output settings of the computing devices currently operating within the given locale. In one embodiment of the invention, the notification messages are generated by the notification message generator module 508 (FIG. 5). When sending a notification message to a given registered computing device, the service provider will access the user/device registry 512 to determine the notification method and notification address to send the notification message to the given registered computing device (see, e.g., TABLE 1).

In another embodiment of the invention, the notification message that is sent to a given registered computing device can include information with regard to the current output settings of the given registered computing device, and possibly the current output settings of one or more other registered computing devices associated with the same user. By way of example, the service provider can access the information contained in the user/device registry 512 to determine if two are more registered computing devices (which are currently operating in the given locale) belong to the same user. As shown in TABLE 1 above, for example, two registered computing devices with DEVICE IDs D3 and D4 are shown to belong to the same registered user of USER ID=U2. If both devices D3 and D4 of the user U2 are determined to be currently operating in the given locale, then the notification message sent to each device D3 and D4 can include information with regard to the current output settings of both devices D3 and D4. This would enable the user U2 to have notification of the current output settings with regard to both devices, even if one of the device is currently operating in the given locale, but not actually being used by the user (e.g., mobile phone of user U2 is in jacket pocket or pocket book, for example).

In another embodiment of the invention, the notification message can include specific suggestions by the service provider for adjusting the output settings of a given device. For example, if a given computing device is determined to be operating in a library locale, based on one or more pre-specified policies 518, the notification message can include a statement such as "It is suggested to mute all audio settings since you are located in a library", or some other suggestive form of notification in that regard.

On the client device side, in one embodiment of the invention, the given computing device will receive a notification message transmitted from the service provider, wherein the notification message comprises information regarding the normative of device output settings of all registered computing devices currently operating in the same locale as the given computing device (bock 604). In other embodiments of the invention, the notification message may include other information as discussed above, such as the actual output settings of the given computing device (and other computing devices associated with the same user), or suggestions by the service provider for adjusting output settings, etc.

The social norm client application 410 will compare the normative of device output settings to the actual output settings of the given computing device to determine if the one or more of the device output settings comply with the normative of device output settings (block 606). In one embodiment of the invention, this process is performed by the output settings status acquisition module 412 querying the output modules 402, 404, 406, 408 or otherwise accessing settings information from the "notifications center" to determine the current status of one or more output settings of the given computing device, and comparing the actual settings against the normative of device output settings. In another embodiment of the invention, when the notification message sent to the given computing device includes information regarding the current output settings of the given computing device, the social norm client application 410 can perform the comparison using the information contained in the notifications message.

The social norm client application 412 will then render and present a notification message to the user of the given computing device, which is based on the normative of device output settings and the compare results (block 608). The notification message that is rendered and presented to the user is configured to provide notification as to whether or not one or more of the device output settings of the user's given computing device complies with the determined normative device output settings. This notification can be provided with regard to one or more global output parameters (e.g., ALL OUTPUT SETTINGS, ALL AUDIO OUTPUTS, ALL VISUAL OUTPUTS, or ALL TACTILE OUTPUTS) or with regard to one or more specific output parameters with regard to audio, visual and/or tactile notifications (see, e.g., TABLE 3). By way of example, the notification message may include the summary data of output settings of the registered devices in the given locale, along with an indication as to the current settings of the computing device to allow the user to compare the current settings with the normative settings.

In another embodiment, the notification that is presented to a user can include the normative settings information, along with an informative statement or suggestion to the user. For example, the notification message can include a statement such as: The output settings of your device comply with the normative of device output settings for devices within your current locale, or a statement such as: The output settings of your device do not comply with the normative of device output settings for devices within your current locale. It is suggested that you mute the audio output settings of your device, or other similar statements.

In another embodiment of the invention, the notification message rendering module 416 and/or device output settings control module 418 (FIG. 4) of social norm client application 410 can generate and render control elements (e.g. icons, messages, etc.) that can be selected by the user to adjust the one or more device output settings that are deemed to not comply with the normative device output settings. For example, as noted above, a notifications message may include the following statements: The output settings of your device do not comply with the normative of device output settings for devices within your current locale. It is suggested that you mute the audio output settings of your device", along with a control statement—Do you want to mute the audio output settings of your device? Yes or No. In this example embodiment, the "Yes" and "No" elements that are displayed can be user-selectable elements that the user can select to automatically adjust the device output setting(s) as suggested by the notification message, or maintain the current device output setting(s). In particular, the user can select the displayed icon "Yes" to mute the audio settings of the user's computing device.

In another embodiment of the invention, when a user is currently operating two or more registered computing devices in a given locale, similar types of notifications and suggestions for all of the user's registered computing devices can be rendered on each of the user's registered computing devices operating in the given locale, so that the user can determine the compliance or non-compliance of all the user's registered computing devices in the given locale by reviewing the notifications that are rendered and presented on one of the computing devices. Moreover, when two computing devices of the user are tethered by a short range network connection (e.g., Bluetooth connection), the control icons that are rendered and displayed on one computing device along with the notifications can be selected to adjust the settings on the other network connected computing device.

For example, assume that a user is using a laptop device and a mobile phone in a given locale, and that the laptop device and mobile phone are both registered with the service provider computing system 500. The user may receive the following notification message on both the laptop device and the mobile phone—The output settings of your laptop device comply with the normative of device output settings for devices within your current locale. The output settings of you mobile phone do not comply with the normative of device output settings for devices within your current locale. It is suggested that you mute the audio output settings of your mobile phone. This notification provides notice to the user in a way that allows the user to have notice of the output settings of each of the user's currently active devices in the give locale, while the user may actually be using only one device. Moreover, if the user's devices are network tethered, the notification on the laptop device may include a control statement such as—Do you want to mute the audio output settings of your mobile phone? Yes or No. In this manner, the user can control output settings of another device with control icons displayed on a different device.

Referring again to FIG. 6, while operating in a given locale, the social norm client application 410 will wait for the occurrence of a predefined invention to provide a device output settings update to the service provider (block 610). When a predefined event is detected which triggers a device output settings update to be sent to the service provider (affirmative determination in step 610), the social norm client application 410 will transmit current device output settings information of the computing device to the service provider (block 602), and this updated device output settings information will be used (along with the updated device output settings information received by other computing devices) to update the normative of device output settings and provide updated notifications.

As noted above, a predefined event (in block 610) can be when one or more output settings of the computing device are changes, or when the computing device is turned-off, for example. Moreover, on the service provider side, an updated normative of device output settings can be computed for a given locale and provided (via notification messages) to the registered computing devices currently operating in the give local when push messages are received by the service provider from registered computing device providing newly updated device output settings information.

Embodiments of the invention include a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Embodiments of the invention are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

These concepts are illustrated with reference to FIG. 8, which shows a computing node 10 comprising a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

In FIG. 8, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 12 typically includes a variety of computer system readable media. Such media may be any available media that is accessible by computer system/server 12, and it includes both volatile and non-volatile media, removable and non-removable media.

The system memory 28 can include computer system readable media in the form of volatile memory, such as random access memory (RAM) 30 and/or cache memory 32. The computer system/server 12 may further include other removable/non-removable, volatile/nonvolatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As depicted and described herein, memory 28 may include at least one program product having a set (e.g., at least one) of program modules that are configured to carry out the functions of embodiments of the invention.

The program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc., one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   at least one computing node of a service provider in network communication with a plurality of computing devices operating in a locale, wherein the at least one computing node is configured to perform method steps comprising:
   receiving device output settings information and device locale information from each of the plurality of computing devices, wherein the device locale information indicates the locale in which the plurality of computing devices are currently operating, and wherein the device output settings information comprises current output settings of each of the plurality of computing devices;
   determining a normative of device output settings of the plurality of computing device operating in the locale using the current output settings and the device locale information of the plurality of computing devices, wherein determining the normative of device output settings comprises determining a majority output setting of at least one type of device output setting of the plurality of computing devices operating in the locale;

generating a notification message which comprises the normative of device output settings of the plurality of computing device operating in the locale; and sending the notification message to at least one computing device of the plurality of computing devices operating in the locale, wherein the notification message is configured to enable a determination as to whether or not a device output setting of the at least one computing device complies with the normative of device output settings of the plurality of computing device operating in the locale.

2. The system of claim 1, wherein the at least one type of device output setting comprises at least one of an audio output setting, a visual output setting, a tactile output setting, and a combination thereof.

3. The system of claim 1, wherein determining the normative of device output settings of the plurality of computing device operating in the locale further comprises:
   determining a locale type of the locale; and
   accessing policy information that specifies a normative of device output settings in the locale according to the locale type of the locale.

4. The system of claim 1, wherein determining the normative of device output settings of the plurality of computing device operating in the locale further comprises generating a summary of a status of one or more device output settings of the computing devices operating in the locale.

5. The system of claim 1, wherein the method steps further comprise determining an amount of the plurality of computing devices operating in the locale, wherein the notification is generated when the amount of computing devices is determined to meet or exceed a predetermined threshold amount.

6. An article of manufacture comprising a non-transitory computer readable storage medium having program code embodied therewith, wherein the program code is executable by a computer processor to cause the computer to perform method steps comprising:
   accessing device output settings information of a plurality of computing devices operating in a locale, wherein the device output settings information comprises current output settings of each of the plurality of computing devices;
   determining a normative of device output settings of the plurality of computing device operating in the locale using the accessed device output settings information, wherein determining the normative of device output settings comprises determining a majority output setting of at least one type of device output setting of the plurality of computing devices operating in the locale;
   generating a notification message which comprises the normative of device output settings of the plurality of computing device operating in the locale; and
   sending the notification message to at least one computing device of the plurality of computing devices operating in the locale,
   wherein the notification message is configured to enable a determination as to whether or not a device output setting of the at least one computing device complies with the normative of device output settings of the plurality of computing device operating in the locale.

7. The article of manufacture of claim 6, wherein the at least one type of device output setting comprises at least one of an audio output setting, a visual output setting, a tactile output setting, and a combination thereof.

8. The article of manufacture of claim 6, wherein determining the normative of device output settings of the plurality of computing device operating in the locale further comprises:
   determining a locale type of the locale; and
   accessing policy information that specifies a normative of device output settings in the locale according to the locale type of the locale.

9. The article of manufacture of claim 6, wherein determining the normative of device output settings of the plurality of computing device operating in the locale further comprises generating a summary of a status of one or more device output settings of the computing devices operating in the locale.

10. The article of manufacture of claim 6, wherein the method steps further comprise determining an amount of the plurality of computing devices operating in the locale, wherein the notification is generated when the amount of computing devices is determined to meet or exceed a predetermined threshold amount.

11. The article of manufacture of claim 6, wherein the method steps are implemented by a service provider, and wherein the method steps are implemented with respect to computing devices that are registered with the service provider.

12. The article of manufacture of claim 6, wherein accessing device output settings information of the plurality of computing devices operating in the locale comprises:
   receiving and storing information regarding current device output settings of the plurality of computing devices operating in the locale; and
   accessing the stored information regarding the current device output settings of the plurality of computing devices operating in the locale.

13. The article of manufacture of claim 6, wherein the method steps further comprise determining a locale in which the plurality of computing devices are operating using locale information, wherein the locale information comprises one or more of a beacon identifier, a network identifier of a wireless local area network, and a current location as determined by a global positioning system.

14. An article of manufacture comprising a non-transitory computer readable storage medium having program code embodied therewith, wherein the program code is executable by a computing device to cause the computing device to perform method steps, the method steps comprising:
   transmitting device locale information to a server, wherein the device locale information indicates a locale in which the computing device is currently operating;
   transmitting device output settings information of the computing device to the server;
   receiving a notification message from the server, wherein the notification message comprises information with regard to a normative of device output settings of a plurality of computing devices operating in the locale, as determined by the server, wherein the normative of device output settings of the plurality of computing device operating in the locale indicates a majority output setting of at least one type of device output setting of the plurality of computing devices operating in the locale, as determined by the server; and
   presenting the notification message to a user of the computing device, wherein the notification message is presented in a manner that allows the user to determine whether or not a device output setting of the computing device complies with the normative of device output settings of the plurality of computing devices operating in the locale, as determined by the server.

15. The article of manufacture of claim 14, wherein transmitting device locale information to the server comprises transmitting one of a beacon identifier, a network identifier of a wireless local area network, and a current location as determined by a global positioning system.

16. The article of manufacture of claim 14, wherein the device output settings information comprises at least one of an audio output setting, a video output setting, and a vibrational output setting of the computing device.

17. The article of manufacture of claim 14, wherein the method steps further comprise checking privacy settings or application permission settings of the computing device prior to transmitting the device locale information or the device output settings information, and performing said transmitting steps if the privacy settings or application permission settings allow said computing device to transmit said information.

18. The article of manufacture of claim 14, wherein presenting the notification message comprises displaying the notification on a display screen of the computing device along with a user-selectable item that allows the user to change at least one device output setting of the computing device.

19. The article of manufacture of claim 14, wherein the notification message further comprises information that allows the user to determine whether or not a device output setting of another computing device of the user complies with the normative of device output settings.

20. The article of manufacture of claim 19, wherein presenting the notification comprises displaying the normative of device output settings information on a display screen of the computing device along with a user-selectable item that allows the user to change at least one output setting of the other computing device of the user.

* * * * *